UNITED STATES PATENT OFFICE.

JAMES McKEON, OF OAKLAND, CALIFORNIA.

PROCESS OF PRESERVING TIMBER.

SPECIFICATION forming part of Letters Patent No. 461,365, dated October 13, 1891.

Application filed January 24, 1891. Serial No. 378,936. (No specimens.)

*To all whom it may concern:*

Be it known that I, JAMES MCKEON, of Oakland, in the county of Alameda and State of California, have invented certain new and useful Improvements in Preserving Timber, of which the following is a specification.

This invention relates to the preservation of piles and wood intended to be submerged in sea-water from destruction by the *Teredo navalis*, *Limnoria terebrans*, and other parasites of the sea; of sewer-timber extending to sea-water or otherwise; of foundation-timbers and underpinnings of dwellings and timbers in mines and tunnels from mildew or dry-rot; of bridge-timbers, telegraph-poles, posts, &c., under and above ground, from the ravages of air, earth, and water, and of timber generally from the above causes, the ravages of white ants or other insects, or any other destructive agency.

Supposing my invention to be applied to the preservation of a pile, I first remove the bark from that portion of the pile to be treated, give the said portion any desired shape, as round, square, pentagonal, hexagonal, &c., and impart thereto a smooth surface, and then proceed as follows:

First. By means of a machine or tool (not forming a part of my present invention) worked by hand or other power, containing a collection of square steel spikes set one-half inch or more apart, I prick or puncture the timber on all sides to the depth of, say, three-eighths of one inch or any other desired depth, the indentations being a distance of about half an inch apart and at an angle of from sixty to forty-five degrees depression toward the point or ground end of the pile, thus forming square sacks or pockets. I then give the surface so indented a bath of sulphate of iron, the proportions being eight pounds of sulphate of iron to three gallons of water. In designating the proportions of the several ingredients or substances employed I give them, for convenience and uniformity, in pounds and gallons.

Second. The timber having become sufficiently dry, I apply thereto a light coat of oil of rosin, five gallons, mixed with vitrified lead, fifteen pounds, pulverized glass, fifteen pounds, and marble-dust, twelve pounds.

Third. This coating having dried, I take a thick solution of five (5) gallons of india or para rubber in solution, twenty (20) gallons coal-tar, and three (3) gallons boiled linseed-oil, put them into a kettle, and bring all to a scalding heat. I now slack or draw the fire for, say, ten (10) minutes, then add seven (7) pounds of sugar of lead, twelve (12) pounds of litharge, and ten (10) pounds of black oxide, and again bring up to a scalding heat. The mixture must be constantly stirred for, say, twenty (20) minutes from the time when the first ingredients are put in the kettle, and then ten (10) pounds of a drier (as japan) must be added. The mixture, while kept at a scalding heat, is now to be applied to timber with vigor.

Fourth. I next immediately spread over the timber thus treated pulverized clinkers and burned iron-dust, mixed with iron-filings and quartz or (as an equivalent therefor) marble-dust, in or about the proportions of eight pounds of each. I then take a heavy roller and press these ingredients into the sacks or pockets, filling each cavity. The ingredients may, however, be pressed in with a trowel.

Fifth. When this coat is sufficiently hard, I make a compound of asphaltum, seventy-five pounds, dissolved in boiling tar, twenty-five gallons, and mixed with quartz-dust, twenty-five pounds, and sand, twenty-five pounds, and to each five (5) gallons of this I add five (5) pounds of the exterior fibrous covering of the cocoanut reduced to a coarse pulp and fine threads.

The advantages of the process conducted under the various steps described may be briefly stated as follows: By shaping the pile and giving thereto a flat smooth surface the timber may be pricked evenly and at such distances apart as to allow the compounds to enter and permeate all its pores and fibers. By the formation of square sacks or pockets at an acute angle toward the point or ground end of the pile the compounds filling the cavities are so permanently protected against the friction of tides and the action of sea-water that they cannot be washed out. The substances of the second, third, and fourth treatments will enter each pore and interstice of the timber to the depth of one inch or more, and the other coatings, being insoluble, impervious to water, and indestructible by saline action, will hold the inner coatings firmly against removal for any length of time. The addition of the outer covering of the cocoanut, which is of a tough, fibrous, and antiseptic nature, teredo-proof, and indestructible by the action of sea-water, air, or earth, causes the asphaltum and other substances to be held more firmly together and prevents any possibility of their cracking or opening.

My invention is specially adapted for application to sewer-timbers extending to sea-water, for, as it gives the timber a glassy smooth surface, it is made non-absorbent, and no foul matter can adhere thereto for the generation of noxious gases. For foundations or underpinnings of dwellings, timbers in mines, tunnels, &c., my invention is of great value, for, the ingredients employed being strong antiseptics and disinfectants, the timber treated is rendered proof against mildew or dry rot, thus conducing to health.

The ingredients entering into my process are cheap, and the process is easily worked and simple of application.

I am aware that heretofore some of the ingredients herein mentioned have been used for preserving piles and for other purposes, but not in the proportions or combinations used by me.

Having described my invention, I claim—

1. The within-described method of preserving timber, consisting in puncturing the timber, subjecting it to a bath of sulphate of iron and water, and successively applying a coat of resinous and vitreous material, a paint, a pulverulent composition, and a bituminous coating, substantially as set forth.

2. The within-described method of preserving timber, consisting in puncturing the timber, subjecting it to a bath of sulphate of iron and water, and successively applying a coat of resinous and vitreous material, a paint, a pulverulent composition, and a coating consisting of a bituminous substance, powdered mineral, and the exterior fibrous covering of the cocoanut, substantially as set forth.

In testimony whereof I hereto set my hand and seal.

JAMES McKEON. [L. S.]

Witnesses:
J. J. McCarthy,
Wm. T. Hamilton.